Sept. 16, 1930.          H. S. PETCH          1,776,131
                   PROTECTION OF ELECTRIC SYSTEMS
                         Filed Oct. 12, 1928
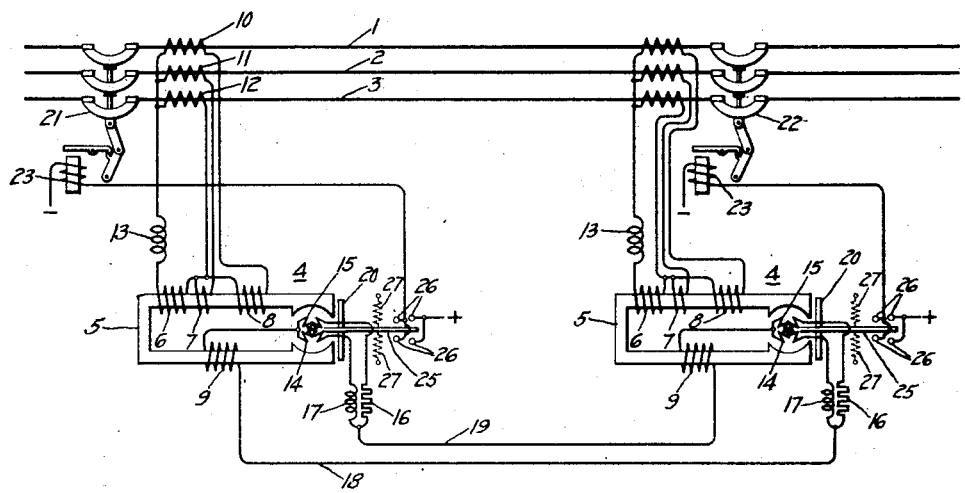
Inventor:
Herbert S. Petch
by Charles E. Tullar
His Attorney Patented Sept. 16, 1930

1,776,131

UNITED STATES PATENT OFFICE

HERBERT STANLEY PETCH, OF LONDON, ENGLAND, ASSIGNOR TO GENERAL ELECTRIC COMPANY, A CORPORATION OF NEW YORK

PROTECTION OF ELECTRIC SYSTEMS

Application filed October 12, 1928, Serial No. 312,168, and in Great Britain November 10, 1927.

My invention relates to improvements in the protection of alternating current systems, whether single phase or polyphase, by means of balanced devices when a portion of the system, such as a feeder, interconnector or the like, or a section of the same, becomes faulty. To some extent, as is hereinafter pointed out, the invention is applicable also for the protection of electric systems against faults occurring in electric apparatus, such as dynamoelectric machines or transformers, or for the protection of a system against a fault causing unbalance between a pair of parallel circuits. An object of my invention is to provide an improved balanced type of protective arrangement whose operation is not impaired by the capacity or charging currents which appear in the auxiliary or pilot circuits especially on the occurrence of abnormal conditions.

Another object of my invention is to provide an improved protective arrangement which in the case of circulating current requires only two pilot or auxiliary conductors.

In protective arrangements of the balanced type, in which protective devices are located at each end of a section of the system to be protected, or on each side of the apparatus, or at adjacent ends of each of two parallel circuits, and connected in a pilot circuit for circulating current or opposed voltages, difficulty arises from the charging or capacity currents which appear in the pilot circuit. Numerous attempts have been made in the past to reduce the capacity currents or to compensate for the same. A proposal has also been made to utilize the variations in magnitude of the capacity current in the pilot conductors for protecting the system in case of a fault, but in this case the actual charging current of a pilot conductor was to be used to operate a protective relay.

In accordance with my invention, a protective relay is adapted to be operated under fault conditions in response to a change in the phase relation between the current and potential of the pilot circuit. In carrying out my invention I accordingly do not attempt to reduce the charging currents on the pilot circuit, but prefer, in some cases, at all events, to increase the charging currents. For this reason, the pilot circuit may comprise a cable having two conductors arranged concentrically or insulated by paper and twisted, this latter type of cable being that commonly used in telephone service for trunk lines. Both these types of cables are subject to a relatively high charging current. It will be evident that, as the value of charging currents on a pilot circuit depends partly on the length of the pilot circuit, my invention is primarily useful in cases in which the balanced devices are relatively far apart, that is, in which a long pilot circuit is necessary, as opposed to protecting a system against a fault in an electrical apparatus or in one of a pair of parallel conductors as aforesaid, although, if the pilot circuit is adapted to demand a relatively high capacity current, my invention may conveniently be used for these latter purposes.

An ordinary circulating current protective arrangement includes an auxiliary conductor, connected between equipotential points of the pilot circuit in which the protective relays are located. The auxiliary conductor must extend from one end of the pilot circuit to the other, or, if a single protective relay were located at the middle of the pilot circuit, then additional conductors from the protective relay contacts to each end of the pilot circuit would be required. The protective apparatus, therefore, demands a minimum of three conductors, two for the pilot circuit proper and one for the protective relays. Now, in accordance with my invention, it is necessary to use only two conductors, (those for the pilot circuit) and fault-responsive relays are connected at each end of the pilot circuit without the use of an auxiliary conductor connecting equipotential points of the pilot circuit. It will be appreciated that this represents a considerable saving of electric conductors.

In one arrangement, according to my invention, balanced devices are located at two appropriate points of the system, for example, at the ends of a feeder, and connected up for circulating current in known manner, the balanced devices preferably being in the form of current transformers, and a protective relay, of the kind that is responsive to the phase difference between the voltage and current of a circuit (for example, a power factor meter) is located at each end of the pilot circuit and connected so as to respond to the phase difference between the voltage and current of the pilot circuit. The relay may comprise moving and fixed coils energized responsively to the current and voltage. The moving coil may comprise two transverse portions, the currents in which are arranged to be displaced a predetermined amount, for example in quadrature.

In an ordinary circulating current protective arrangement, the capacity currents are associated with a fall of potential along each pilot conductor, and the necessary voltage may be regarded as being supplied equally from the balanced devices at the two ends when the portion of the system with which the protective device is associated is healthy. In these conditions there will be a certain phase difference registered by each of the protective relays, the movable elements of which will occupy their normal or off positions. In the event of the section being called upon to carry a through fault current due to the system having become faulty beyond the section being considered, the phase difference between the voltage and current in the pilot circuit will not alter appreciably, and the protective relays will, therefore, remain in their normal position, as the voltage and current will increase proportionally. In the event of the section itself becoming faulty, however, the balance will be upset, the flow of current at the two ends of the section being different or in opposite directions. In these conditions, an increased charging current may be carried by the pilot circuit. The total charging current, however, is not now supplied equally from the two balanced devices, but that balanced device which is carrying the greater primary current will also supply the majority of the charging current, and vice versa. In these conditions, therefore, the phase difference at that end of the section, where the balanced device is supplying the majority of the charging current, will increase above normal, and in like manner, the phase difference at the other end of the section will decrease below normal. The movable elements of both the protective relays will, therefore, operate in opposite directions. By arranging two contacts with each relay, one on each side of each movable element, the auxiliary circuits controlled by the relays will be completed by the operation of the relays, the auxiliary circuits being connected with a tripping coil or tripping device for a circuit breaker located at that end of the section, or being arranged to control an indicator or signalling device, in known manner.

The description which I have given above relates primarily to the protection of a single phase system, though the principle is applicable equally to the protection of a polyphase system. For example, for the protection of a three phase system, a pair of pilot conductors and a protective relay at each end of a section are all that will be required, provided that the protective relay is connected so as to be energized responsively to interphase faults as well as to earth faults occurring on the section under consideration.

The manner in which one relay may be arranged to operate in response to both sets of faults is described in my copending application Serial No. 306972, filed September 19, 1928, and assigned to the same assignee as this invention. According to the disclosure in said application, the secondary windings of current transformers having their primary windings energized responsively to the currents in the respective phase conductors, are connected up with three windings so that two of them will be excited responsively to currents in two of the phase conductors, while the third winding, which has materially more turns than either of the other two windings, is arranged to be energized responsively to the residual current in the polyphase circuit, this third winding being connected with the neutral point of the secondaries of the current transformers either directly or through a choke coil or impedance. Of the other two windings, one has twice the number of turns of the other.

Now, applying this principle to my present invention, I may for protecting polyphase systems, use, as a phase responsive device, a relay which is also adapted to act as a transformer.

My invention will be better understood from the following description when considered in connection with the accompanying drawing and its scope will be pointed out in the appended claims.

In the single figure of the accompanying drawing, there is diagrammatically illustrated an embodiment of my invention in a protective arrangement for a three phase system including phase conductors 1, 2, 3. In this illustrated arrangement, the phase responsive device or relay 4 combines the features of both relay and transformer. The relay 4 as shown is of the dynamometer type and includes a core 5 having thereon a primary winding, which includes three windings 6, 7 and 8, and a fixed secondary winding 9. The windings 6, 7 and 8 have turns of numbers $n$, $m$ and $2m$, respectively, as disclosed in the application above referred to, $n$ being of considerably greater value than $m$. The windings 6, 7 and 8 are connected as shown to the secondary windings 10, 11 and 12 of current transformers connected to be energized in accordance with the currents in the phase conductors 1, 2, 3 of the system to be protected, 13 being an impedance which may be inserted in the lead between a common connection of the secondary windings 10, 11 and 12 and one end of the winding 6. With this arrangement there will be induced in the relay winding 9 through the resultant effect of the windings 6, 7 and 8 a current proportional to the currents in the phase conductors 1, 2 and 3. In case of earth faults, the current flowing in the winding 9 will be proportional to the leakage or residual current since in this case the primary winding 6 is energized in accordance with the vector sum of the currents in the phase conductors 1, 2 and 3. The secondary winding 9 represents the potential coil of the relay 4. In addition, a pair of cooperating movable windings 14 and 15 are arranged transversely of one another and fixed with respect to one another on a movable core in an air-gap of the relay core 5 which may be of horse-shoe shape as shown. The ends of these two movable windings are connected in series, respectively, with an ohmic resistor 16 and an inductive reactor 17, in order that their currents may have a predetermined phase displacement, for example, be substantially in quadrature. The other ends of these movable windings are then connected in series to the fixed secondary winding 9. The other end of the fixed secondary winding is connected to one conductor 18 of the pilot circuit, and the other conductor 19 is connected to the free ends of the resistor 16 and reactor 17. The movable windings 14, 15 represent the current coil of the relay. In order, however, to increase the efficiency of the electroresponsive device 4 as a transformer, it may be convenient to arrange a magnetic member 20, with or without an air gap, in shunt with the air gap in which the movable element including the windings 14 and 15 is located. This is possible because the flux required for operating the device 4 as a relay or meter is less than that required for providing the transformer operation.

As shown, similar apparatus is provided at two points of the system such as the ends of a section of the circuit 1, 2, 3. There are also provided circuit breakers 21, 22 having trip coils 23 whose circuits are arranged to be controlled by the relays 4. For this purpose each of the relays 4 has its movable member 25 which is associated with the windings 14, 15 arranged to control contacts 26 in the circuit of the trip coils 23 upon movement of the member from its central position to which it may be biased by springs 27.

With the relay 4 constructed as shown, it will be obvious that there are available to control the movement of the movable member 25, two opposed torques which arise from the flux in the core 5 due to the primary windings 6, 7 and 8 and the fluxes in the windings 14 and 15 due to the current flowing in the pilot circuit 18, 19. As will be obvious to those skilled in the art, the torque due to the flux in the core 5 and the flux due to the winding 14 is proportional to the product of these fluxes and the cosine of the phase displacement of the fluxes. Similarly, there is an opposing torque due to the flux in the core 5 and the flux of the winding 15. This torque is likewise proportional to the product of these fluxes and the cosine of the phase angle between them. The conditions in the pilot circuit, that is, the relation between the current and the potential thereof are such as substantially to equilibrate the torques and the movable circuit controlling member 25 of the relay 4 is maintained in its central or neutral position. However, in case of an internal fault on the section between the circuit breakers 21, 22 the phase relation between the current and the potential of the pilot circuit is materially changed depending upon the character of the fault and whether the fault may be fed from each end. While the phase displacement between the fluxes due to the windings 14 and 15 remains substantially the same, the phase displacement of these fluxes relatively to the flux in the core 5 changes materially so that the torques due to these two windings and the flux in the core 5 become unbalanced and the movable member 25 is actuated to close one or the other of its sets of contacts 26 in the circuit of the trip coil. It is to be noted that the winding 9 is in effect the potential winding of the relay 4 and that the phase relation of the pilot circuit potential due to the voltage across this winding will vary from the flux due to the windings 6, 7 and 8 in accordance with circuit conditions. For example, under normal conditions the capacity current between the pilot conductors 18 and 19 may be comparatively small but on the occurrence of an internal fault which may be fed from each end, the voltages across the relay windings 9 will be comparatively high and opposed so that there results a large capacity current between the pilot conductors 18, 19. As a result of this a big phase displacement occurs between the current and potential of the pilot circuit and the two torques of the relay become greatly unbalanced.

When my invention is applied to the protection of power transformers, it will be obvious to those skilled in the art that the ratio of the two groups of current transformers on either side of the power transformer should be so chosen with respect to the ratio of the power transformer that the pilot circuit will be normally balanced.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States is:

1. A protective arrangement for a polyphase circuit including a group of current transformers at each end of a section of the circuit, a pilot circuit extending between the ends of said section, and a combined phase responsive relay and transformer at each end interconnecting the group of current transformers with the pilot circuit.

2. A protective arrangement for a polyphase circuit including a pilot circuit and an electromagnetic device at each end of a section of the polyphase circuit having a core, a plurality of primary windings thereon respectively connected to be energized in accordance with the currents in some of the conductors of the polyphase circuit and the residual current thereof and a plurality of cooperating windings connected in the pilot circuit, two of said cooperating windings being arranged to be energized by currents having a predetermined phase displacement.

3. A protective arrangement for an electric system including a pilot circuit extending between two points of the system and connected to be energized therefrom, and means responsive to a change in the relation between the current and the potential of the pilot circuit including an electroresponsive device havig a winding connected to be energized in accordance with the current of the system and cooperating windings connected to the pilot circuit.

4. In a circulating current protective arrangement for an electric system, a pilot circuit including only two conductors and connected to be energized in accordance with the current of the system and a relay operative in response to a change in the phase relation between the current and the potential of the pilot circuit including a plurality of cooperating windings connected in series with the pilot circuit.

5. A balanced protective arrangement for a polyphase circuit including a pilot circuit extending between two points of a polyphase circuit and an electromagnetic device at each of said points having a core, a plurality of primary windings thereon respectively connected to be energized in accordance with the currents in some of the conductors of the polyphase circuit and the residual current thereof, a secondary winding connected in series in the pilot circuit and two cooperating windings connected in parallel with each other and in series with the pilot circuit and arranged to be energized by currents substantially in quadrature.

6. In a balanced protective arrangement for an electric system, a protective circuit including two pilot conductors extending between two points of the system and connected to be energized in accordance with the currents of the system at said points and a relay having cooperating windings connected to be energized from the pilot circuit and arranged to exert opposing torques dependent on the phase relation between the current and the potential of the pilot circuit.

In witness whereof I have hereunto set my hand this 28th day of September, 1928.

HERBERT STANLEY PETCH.